(12) United States Patent
Sherman et al.

(10) Patent No.: US 7,571,112 B2
(45) Date of Patent: Aug. 4, 2009

(54) VIRTUAL PRIVATE RADIO STATION VIA VIRTUAL PRIVATE NETWORK

(75) Inventors: Marc Adam Sherman, New York, NY (US); Thomas W. Sherman, Jr., Huntington, NY (US)

(73) Assignee: Verizon Business Global LLC, Basking Ridge, NJ (US)

( * ) Notice: Subject to any disclaimer, the term of this patent is extended or adjusted under 35 U.S.C. 154(b) by 886 days.

(21) Appl. No.: 10/910,369

(22) Filed: Aug. 4, 2004

(65) Prior Publication Data

US 2006/0029040 A1      Feb. 9, 2006

(51) Int. Cl.
*G06Q 30/00* (2006.01)
(52) U.S. Cl. .............................. 705/14; 705/10; 709/224
(58) Field of Classification Search .................... 705/14; 713/163; 709/247, 100; 707/100
See application file for complete search history.

(56) References Cited

U.S. PATENT DOCUMENTS

| | | | | |
|---|---|---|---|---|
| 7,310,730 | B1 * | 12/2007 | Champagne et al. | 713/163 |
| 2002/0055924 | A1 * | 5/2002 | Liming | 707/100 |
| 2003/0079041 | A1 * | 4/2003 | Parrella et al. | 709/247 |
| 2004/0073482 | A1 * | 4/2004 | Wiggins et al. | 705/14 |
| 2004/0225564 | A1 * | 11/2004 | Walsh et al. | 705/14 |

* cited by examiner

*Primary Examiner*—Fan Tsang
*Assistant Examiner*—Simon King

(57) ABSTRACT

A method and a system are provided. A request is received from a first device through a network. Local content is selected from a group of different local content to send to the first device via the network, where the selecting of the local content is based on an indicator included with the request. Audio data may be sent with the selected local content to the first device via the network.

28 Claims, 5 Drawing Sheets

VIRTUAL PRIVATE RADIO STATION VIA VIRTUAL PRIVATE NETWORK

TECHNICAL FIELD

Systems and methods consistent with principles of the invention relate generally to delivery of audio content through a network, and more particularly to delivery of audio content and local messages via a Virtual Private Network (VPN).

BACKGROUND OF THE INVENTION

One may listen to music using an existing radio, which receives and plays music broadcast via radio frequency (RF), via a satellite radio, which receives and plays music sent via satellite transmissions, or via a processing device, which receives and plays music received as audio data via a network, such as the Internet. Such transmissions may be broadcast, such that anyone with the proper equipment may receive and play the received music. Further, such broadcasts may also include notices or advertisements. Broadcasts received via RF may include local notices or advertisements. However, the local notices or advertisements, generally, pertain to a regional area, such as a metropolitan area, and not to any one particular neighborhood. Further, listeners of the transmission in a metropolitan area typically hear the same notices and advertisements regardless of their location. Listeners of network audio broadcasts, such as Internet radio broadcasts, may hear notices and advertisements, but the notices and advertisements are, generally, either not of a local nature, or not addressed to any particular neighborhood.

Various businesses, such as, for example, coffee shops, restaurants, book stores, etc., generally play music for their patrons. The music may be provided by a stereo system that outputs the music to speakers or a public address system for the patrons' enjoyment. The music is intended to put patrons in a good frame of mind, which merchants hope would translate into increased sales.

Merchants may be able to increase their sales if they could receive and play, for their patrons, music with occasional breaks for local notices, such as sales of certain items, or occasional local or neighborhood advertisements, such as a discount price for a specialty coffee drink at the neighborhood coffeshop if certain items are purchased. Such a system that provides the ability to receive and play music, with occasional breaks for notices and advertisements targeted to patrons in a particular locality, and which provides the ability to shape the notices and advertisements for particular merchants in a way that may enhance sales is desired.

SUMMARY OF THE INVENTION

In a first aspect, a method is provided. The method includes receiving a request from a first device through a network, selecting local content from a group of different local content to send to the first device via the network, where the selecting of the local content is based on an indicator included with the request, and sending the selected local content to the first device via the network.

In a second aspect, a system is provided for delivering audio data via a network. The system includes a first processing device and a second processing device. The first processing device is configured to receive a request, via the network, from the second processing device, select a local content from a plurality of different local content based on an indication included with the request, and send the selected local content to the second processing device. The second processing device is configured to receive the selected local content.

In a third aspect, a machine-readable medium containing instructions for controlling at least one processor to perform a method is provided. The method includes receiving a request, via a network, from a first processing device, selecting local content from a group of different local content based on an indication included with the request, and sending the selected local content and audio data to the first processing device via the network.

In a fourth aspect, a machine-readable medium containing instructions for controlling at least one processor to perform a method is provided. The method includes sending a request to a first processing device via a virtual private network, receiving a schedule of local content from the first processing device via the virtual private network, and receiving audio data and local content from the processing device via the virtual private network, where the audio data and the local content are sent separately from one another.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and their equivalents.

Exemplary Virtual Private Radio Station

Figure 1:
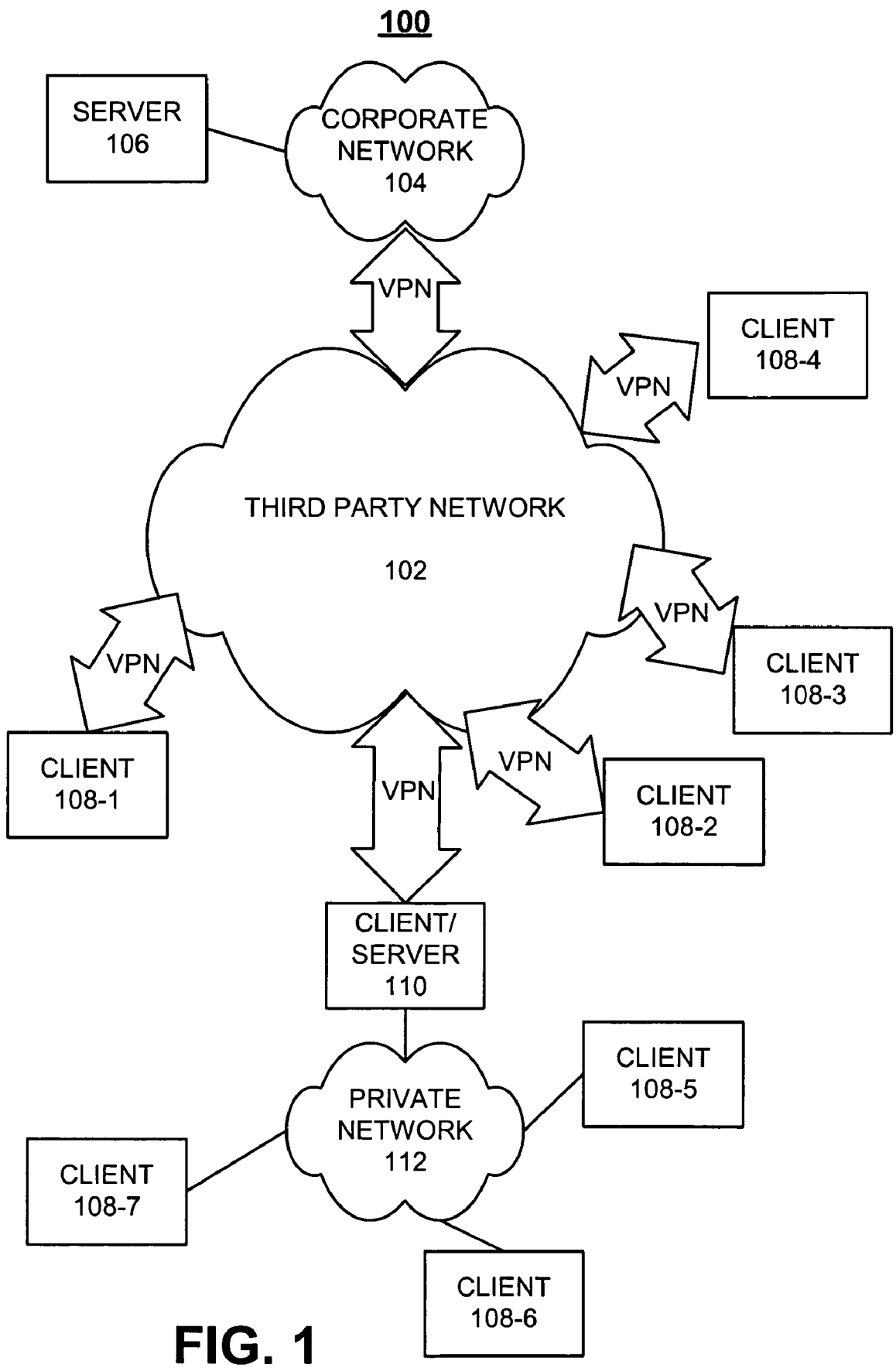
FIG. 1 illustrates an exemplary system that includes an implementation of a virtual private radio consistent with the principles of the invention.

FIG. 1 illustrates an exemplary system 100 in which system and methods consistent with the principles of the invention may be implemented. System 100 may include a third party network 102, a corporate network 104, a server 106, client devices 108-1 through 108-7, client/server 110, and a private network 112.

Third party network 102 may be a network of networks, such as the Internet, or may be a private network managed and operated by a third party. Corporate network 104 may be any type of network, such as a local area network (LAN), a synchronous optical network (SONET), or other type of network. Server 106 may be a processing device, such as a host computer or a personal computer, or a cluster of processing devices capable of storing large amounts of audio data. In some implementations of system 100, server 106 may be located at a merchant's headquarters. Client devices 108-1 through 108-7 (collectively referred to as 108) may be processing devices, such as, for example, a personal computer with storage capacity for audio files. Client/server device 110 may be a processing device, such as a host computer or a personal computer, or a cluster of processing devices capable of storing large amounts of audio data. Private network 112 may be, for example, a corporate network.

Virtual private networks (VPNs) are well known and effectively extend the reach of a private network, such as a corporate network, through one or more third party networks by providing a private tunnel through the third party network or networks, such that authorized users may have access to the private network through the VPN. VPNs may also provide users with a secure path to a private network via the use of encryption, such that an eavesdropper would not be able to interpret any intercepted traffic. In implementations of system 100 consistent with the principles of the invention, communications between server 106 and client devices 108-1 through 108-4 may occur through a VPN and communications between client/server 110 and client devices 108-5 through 108-7 may occur via private network 112.

In an alternate configuration of system 100, instead of including private network 112, client/server 110 and client devices 108-5 through 108-7 may each be connected through a third party network, such as, for example, third party network 102 and may communicate with one another via a second VPN connecting client/server 110 with each of client devices 108-5 through 108-7, thus forming a virtual private network. Thus, in some implementations consistent with the principles of the invention, client/server 110 may be connected to server 106 via one VPN and may be connected with client devices 108-5 through 108-7 via another VPN.

In one implementation consistent with principles of the invention, client devices 108-1 through 108-4 may each be located at different locations, such as individual stores. Client devices 108-1 through 108-4 may each request audio content from server 106 via the VPN. Server 106 may receive the request, which may include identifying information from each of client devices 108-1 through 108-4, and may provide audio content, such as music, as well as local notices and local advertising to client devices 108-1 through 108-4. The audio content may include local notices and/or advertising specific to a location, such as a neighborhood, of receiving client devices 108-1 through 108-4. Thus, the audio content received by client devices 108-1 through 108-4 may or may not be identical.

In some implementations of system 100, client/server 110 may be located at a merchant's regional office and may request audio content from server 106 in the same manner as client devices 108-1 through 108-4. Responsive to the request from client/server 110, server 106 may deliver audio content, including local notices for the region as well as advertising for the region. Client devices 108-5 through 108-7 may request audio content from client/server 110. Thus, client/server 110 may offset some of the load from server 106 by providing requested audio content to client devices 108-5 through 108-7.

System 100 of FIG. 1 is exemplary and may contain more or fewer components than illustrated. For example, system 100 may not include client/server 110 and may include only client devices 108 that receive audio content from server 106.

In another implementation, system 100 may include multiple client/server devices 110 and server 106 may service requests from each one of the client/server devices 110, which, in turn, services groups of client devices 108.

Exemplary Processing Device

Figure 2:
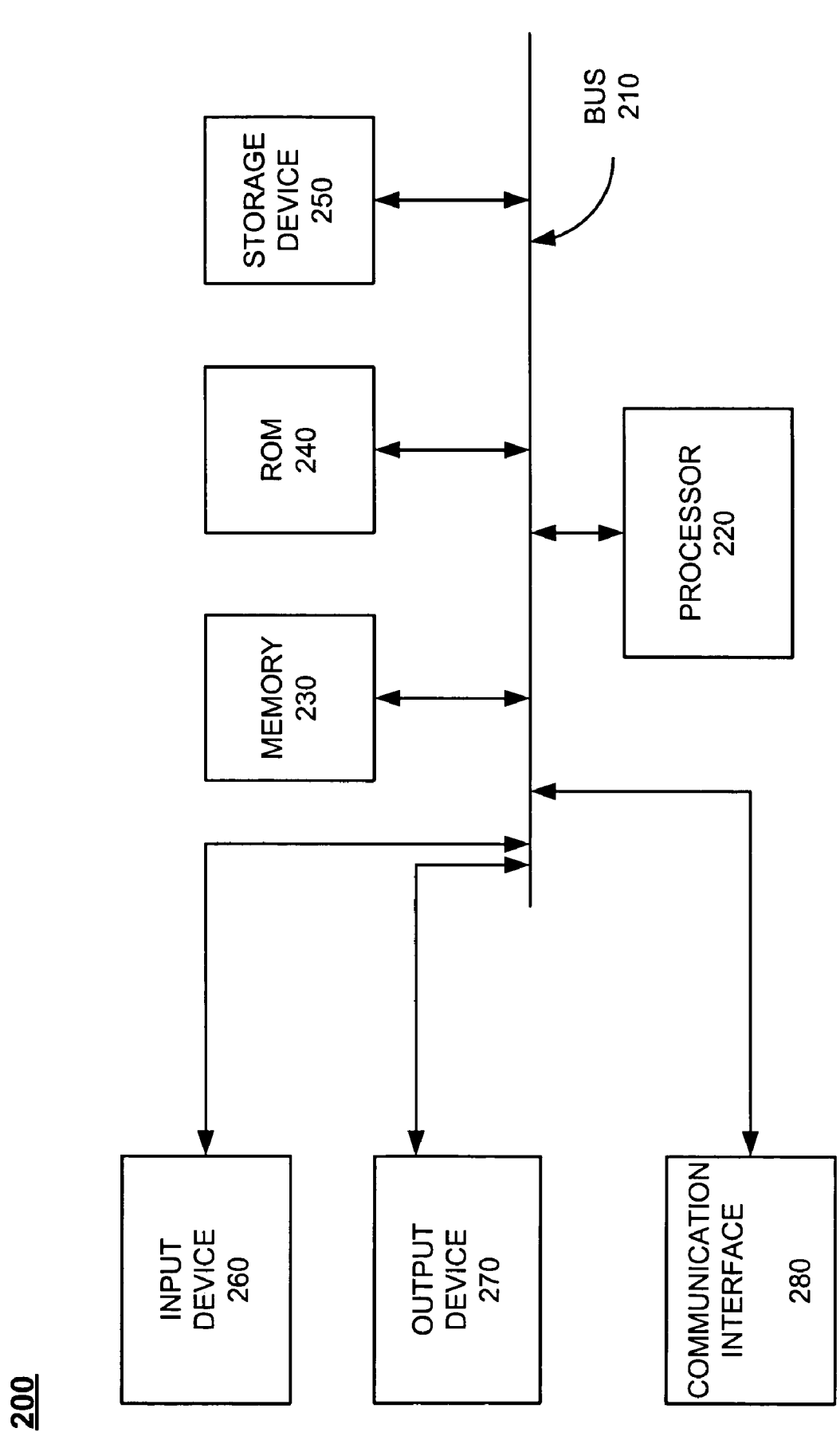
FIG. 2 is a functional block diagram of a processing device that may implement a server, client device, or a client/server, shown in FIG. 1.

FIG. 2 is a functional block diagram that illustrates a processing device 200 that may be used to implement any of server 106, client devices 108, or client server 110. Device 200 may include a bus 210, a processor 220, a memory 230, a read only memory (ROM) 240, a storage device 250, an input device 260, an output device 270, and a communication interface 280. Bus 210 may permit communication among the components of device 200.

Processor 220 may include one or more conventional processors or microprocessors that interpret and execute instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of magnetic or optical recording medium and its corresponding drive, such as a magnetic disk or optical disk and its corresponding disk drive.

Input device 260 may include mechanisms that permit a user to input information to system 200, such as a keyboard, a mouse, a pen, a biometric mechanism, such as a voice recognition device, etc. Output device 270 may include mechanisms that output information to the user, including a display, a printer, one or more speakers, etc. Communication interface 280 may include any transceiver-like mechanism that enables device 200 to communicate via a network. For example, communication interface 280 may include a modem or an Ethernet interface for communicating via third party network 102, private network 112, or corporate network 104. Alternatively, communication interface 280 may include other mechanisms for communicating with other networked devices and/or systems via wired, wireless or optical connections.

Device 200 may perform functions in response to processor 220 executing sequences of instructions contained in a computer-readable medium, such as memory 230. A computer-readable medium may include one or more memory devices and/or carrier waves. Such instructions may be read into memory 230 from another computer-readable medium, such as storage device 250, or from a separate device via communication interface 280.

Execution of the sequences of instructions contained in memory 230 may cause processor 220 to perform certain acts that will be described hereafter. In alternative implementations, hard-wired circuitry may be used in place of or in combination with software instructions to implement the present invention. Thus, the present invention is not limited to any specific combination of hardware circuitry and software.

Exemplary Processing

As mentioned above, some client devices 108-1 through 108-4 may request audio content from server 106. Client/server 110 may appear similar to one of client devices 108 when sending a request to server 106. Some client devices, such as client devices 108-5 through 108-7 may request audio content from client/server 110. Thus, client/server 110 may function as a server to client devices 108-5 through 108-7 and may function as a client device to server 106. Thus, client/server 110 may perform both server and client device processing discussed below.

Figure 3:
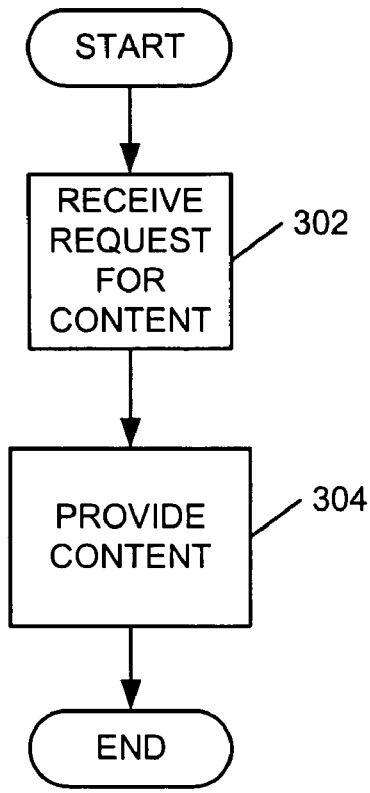
FIG. 3 is a flowchart that illustrates exemplary processing of the server and the client/server (acting as a server)

FIG. 3 is a flowchart that illustrates exemplary processing in an implementation of server 106 or client/server 110 (acting as a server) consistent with the principles of the invention. Server 106 may receive a request for audio content from one of client devices 108-1 through 108-5 or client/server 110 (acting as a client device) (act 302). In addition, client/server 110 (acting as a server) may receive a request for audio content from one of client devices 108-5 through 108-7. In each case, the request may include a client device ID. Server 106 or client/server 110 (acting as a server) may respond to the request by providing the audio content to requesting client device 108 or client/server device 110 (acting as a client device) (act 304). The audio content may include local notices and advertisements as well as music. Alternatively, the audio content may include the local notices and advertisements and no music. Server 106 and client/server 110 (acting as a server) may select audio content for the requesting device based on the provided client device ID. Server 106 and/or client/server 110 may store a database of client device IDs along with corresponding information, such as location information, type of business, name of business, etc. Thus, the audio content delivered to the requesting device may have local notices and advertisements integrated into the audio content based on the provided client ID. The requesting device may either store or play the received audio content. The audio content may also be correlated to other factors, such as time of day (e.g., provide lunch special information vs. dinner special information for a restaurant), time of year (winter vs. summer), etc.

In an alternative implementation consistent with the principles of the invention, server 106 may deliver audio content including music, a schedule of local notices and local advertisements, and audio content for local notices and local advertisements. The schedule of local notices and advertisements may be sent by server 106 to client devices, such as client devices 108-1 through 108-4 and client/server 110 (acting as a client device). Client/server 110 (acting as a server) may deliver the schedule and audio content for local notices and advertisements to client devices 108-5 through 108-7 when requested by client devices 108-5 through 108-7.

In this alternative implementation, each audio message of the audio content may include a header that has a sequence number. The sequence number may be incremented by one for each succeeding audio message. Prior to delivering audio content to client devices 108-1 through 108-4 and client/server 110, server 106 may deliver the advertising schedule, which may include a first audio sequence number and a duration in, for example, seconds or some other convenient time period that indicates a duration of the local notice or local advertisement, and a second audio sequence number of a next audio message to include musical content. The first audio sequence number may be the audio sequence number preceding a scheduled local notice or local advertisement. After the audio message including the first audio sequence number, several blank audio messages may follow. The blank audio messages may later be filled with local notice or advertisement information.

Figure 4:
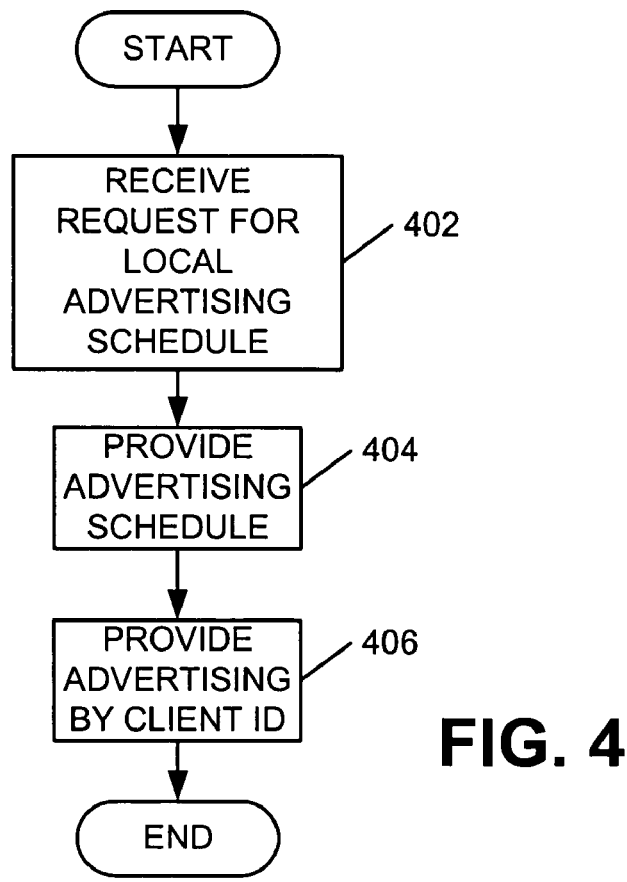
FIG. 4 is a flowchart that illustrates exemplary processing of the server and the client/server (acting as a server) in another implementation consistent with the principles of the invention.

FIG. 4 is a flowchart that illustrates exemplary processing of server device 106 or client/server 110 when receiving a request for the schedule for local notices and advertising. Typically, client devices 108 and client/server 106 (when acting as a client) may request the schedule before requesting the audio content containing music. The request may contain a client device ID, which the server 106 or client/server 110 (acting as a server) may use to determine which local notices and advertisements to deliver to client devices 108 and client/server 110 (acting as a client device). In one implementation consistent with the principles of the invention, client/server 110 may send multiple client device IDs to server 106 when multiple client devices 108 serviced by client/server 110 may be in different locations and therefore may desire different local notice and advertisement content from one another.

Server 106 or client/server 110 (when acting as a server) may begin by receiving a request from client devices 108 or client/server 110 (when acting as a client) for a schedule of local advertising and notices (act 402). Server 106 or client/server 110 (when acting as a server) may then provide the schedule to the requesting device (act 404). As mentioned above, some requesting devices (for example, client/server 110 servicing client devices 108, which may desire different local notice and advertisement content from one another) may provide one or more client device IDs in the request sent to server 106. In this case, the requesting device may receive multiple advertising schedules and notices/advertisements based on the client device IDs provided. The requesting device may automatically receive content following receipt of the schedule. Alternatively, the requesting device may request the content after receiving the schedule. Server 106 or client/server 110 (when acting as a server) may provide audio for local advertising and notices to the requesting device (act 406). Server 106 may provide multiple sets of the audio for local advertising and notices in response to receiving a request with multiple client device IDs from client/server 110. The particular content of the local advertising and notices sent from server 106 or client/server 110 (when acting as a server) may differ depending on the client device ID provided by the requesting device.

Figure 5:
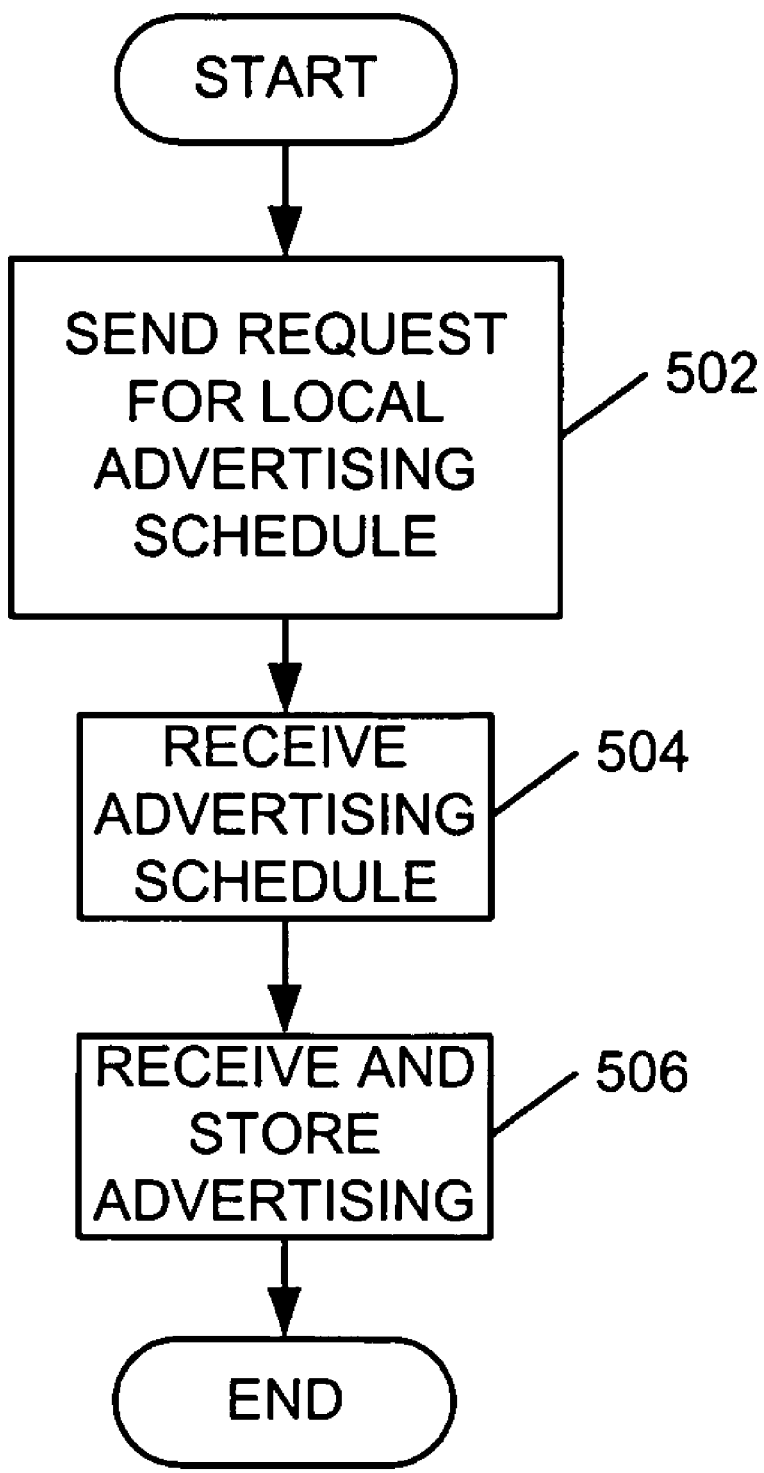
FIG. 5 is a flowchart that illustrates exemplary processing of the client device and the client/server (acting as a client) in an implementation consistent with the principles of the invention.

FIG. 5 is a flowchart that illustrates exemplary processing in client devices 108 and client/server 110. Client devices 108 or client/server 110 (when acting as a client) may send a request for the schedule of local advertising and notices to server 106 or client/server 110 (acting as a server) (act 502). Client devices 108 or client/server 110 may receive the schedule from server 106 or client/server 110 (acting as a server) (act 504). Content may automatically follow delivery of the schedule. Alternatively, client devices 108 or client/server 110 (acting as a client) may request content after receiving the schedule. Server 106 or client/server 106 (when acting as a server) may then provide audio for the local notices and advertisements. Client devices 108 or client/server 110 (when acting as a client) may receive and store the audio for the local advertising and notices (act 506).

In an exemplary implementation described above, audio sequence numbers are used to indicate when local notices or advertisement are to be inserted into the audio. However, it should be understood that other methods may also be used to indicate when local notices or advertisements are to be inserted into an audio stream. For example, a flag set in a message header may indicate that local notices and advertisements are to be inserted after the flag is detected.

Figure 6:
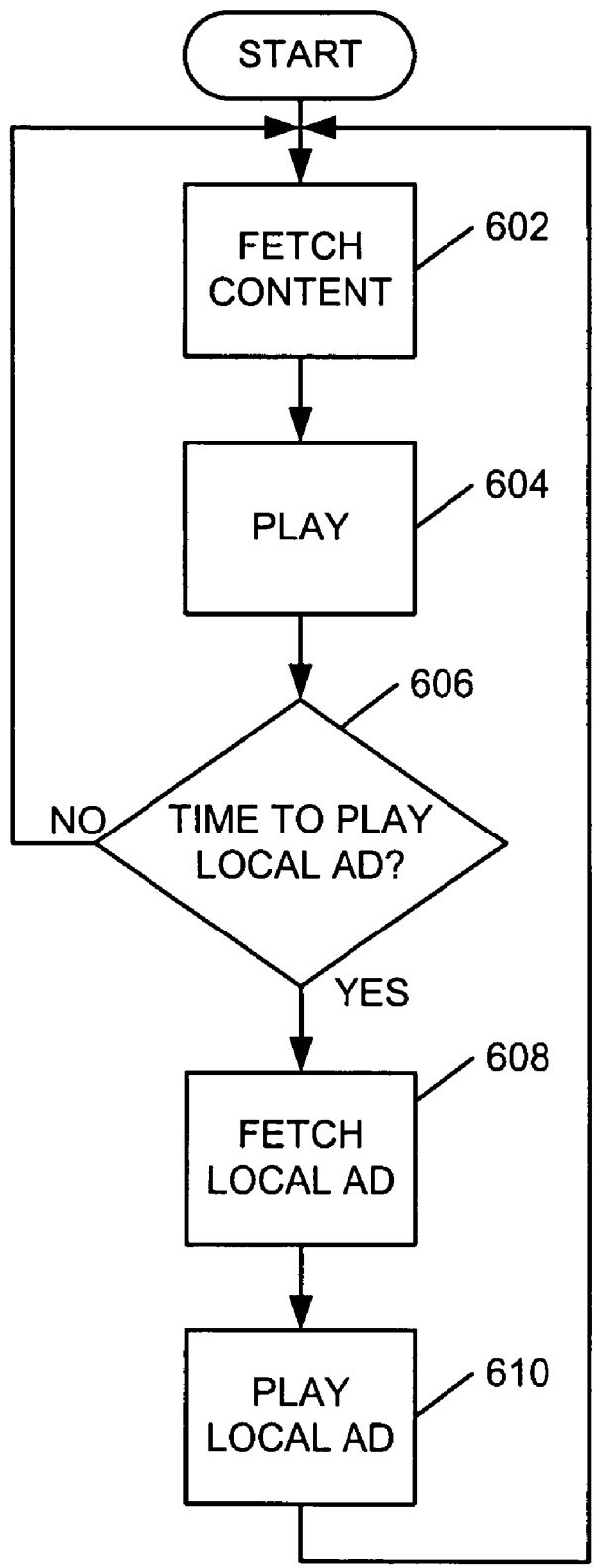
FIG. 6 is a flowchart that illustrates exemplary processing of the client device in an implementation consistent with the principles of the invention.

FIG. 6 is a flowchart that illustrates exemplary processing in client device 108. Audio content, including music, may already be stored locally at client device 108 after receiving the audio content from server 106 or client/server 110 or some of the audio content may be stored while additional audio content is currently being received by client device 108. Client device 108 may begin by fetching a portion of the audio content, including music (act 602). Client device 108 may play the audio content over speakers (act 604). Client device 108 may then determine whether a local notice or advertisement should be played, as indicated by the schedule and an audio sequence number in a message header, as described previously, or another mechanism (act 606). If a local notice or advertisement is to be played, client device 108 may fetch an audio portion of the local notice or advertisement scheduled to be played (act 608). The local notice or advertisement may be previously stored locally at client device 108. Client device 108 may then play the local notice or advertisement over one or more speakers (act 610). At an appropriate point, for example, when a second audio sequence number is detected in the audio content stream, client device 110 may again fetch the musical audio content (act 602) and continue to play music through the one or more speakers (act 604). In an alternative implementation, in which music and local notices and advertisement are integrated, client device 108 may repeat acts 602 through 604 without a need to check for a time to play local advertisements.

Variations

Some of the above implementations describe client devices 108 as inserting local advertisements and notices into audio output at appropriate places. However, one of ordinary skill in the art would understand that other variations are also possible. For example, client/server 110 may receive the local advertisements and notices from server 106 and may insert the audio for the local advertisements and notices into the audio content delivered to client devices from client/server 110. Similarly, server 106 may insert the audio for the local advertisements and notices into the audio content delivered to client devices or client/server 110 (acting as a client device). Thus, client devices 108, which receive audio from server 106 or client/server 110 may not need to perform processing to insert local notices or advertisements into the audio output. Alternatively, server 106 or client/server 110 may provide the local notices/advertisements without a schedule and/or without music and allow client devices 108 to play the notices/advertisements at any particular time.

Analysis of Sales

Each store may maintain point-of-sale (POS) data regarding sales volume of each item, inventory, or other information. The POS data may be periodically sent, for example, monthly, weekly, or any other time period, to a department, such as a marketing department via a VPN or other mechanism. The POS data may be analyzed and the results of the analysis may drive content and timing of local notices and advertisements. Further, an effect of local notices and advertisements on sales may be analyzed and airtime rates for local notices and advertisements may be set based on the sales effect of the notices and advertisements. Thus, local advertisements and notices may be controlled at a central location in some implementations.

CONCLUSION

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain aspects have been described as implemented in software, other configurations may be possible.

While series of acts have been described with regard to FIGS. 3-6, the order of the acts is not critical. In addition, acts described above as being performed by one device/subsystem may alternatively be performed by another device/subsystem. Further, in still other alternative implementations, a single device/subsystem may perform all of the acts described above as being performed by a number of devices/subsystems. No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. A method comprising:

receiving, at a first processing device via a network, a first request for multiple sets of audio data, each of the sets of audio data including location-specific content corresponding to each of a plurality of business locations, where the first request includes multiple client device identifiers (IDs) for ones of the business locations;

selecting, by the first processing device and from a plurality of stored, different location-specific content and responsive to the first request, location-specific content corresponding to each of the ones of the business locations based on the client device IDs included with the first request; and sending, by the first processing device and as part of an audio data stream, the sets of the audio data including the selected location-specific content to the ones of the business locations via the network, where at least some of the sets of the audio data differ and the ones of the business locations receive the audio data stream and produce sound from the audio data stream via a second processing device.

2. The method of claim 1, where the sending sets of the audio data including the selected location-specific content is performed via a virtual private network.

3. The method of claim 1, where the location-specific content includes a local notice or a local advertisement.

4. A method comprising:

receiving, at a first processing device and via a network, a first request for multiple sets of audio data, each of the sets of audio data including location-specific content corresponding to each of a plurality of business locations, where the first request includes multiple client device identifiers (IDs) for ones of the business locations;

selecting, by the first processing device and from a plurality of stored, different location-specific content and responsive to the first request, location-specific content corresponding to each of the ones of the business locations based on the client device IDs included with the first request;

sending, by the first processing device, the sets of the audio data including the selected location-specific content to the ones of the business locations via the network, where at least some of the sets of the audio data differ;

receiving, by a second processing device at the ones of the business locations, the sets of the audio data including the selected location-specific content, the location-specific content being included as part of the audio data; and storing the received audio data.

5. The method of claim 4, further comprising:

receiving, at one of the ones of the business locations, a second request from a device via a second network; and delivering the stored audio data to the device via the second network.

6. The method of claim 5, further comprising:
producing, at the device, sound from the audio data.

7. The method of claim 5, where the second network includes a virtual private network, and the delivering the stored audio data is performed via the virtual private network.

8. A method comprising:
receiving, at a processing device via a network, a first request for multiple sets of audio data, each of the sets of audio data including location-specific content corresponding to each of a plurality of business locations, where the first request includes multiple client device identifiers (IDs) for ones of the business locations;
selecting, by the processing device and from a plurality of stored, different location-specific content and responsive to the first request, location-specific content corresponding to each of the ones of the business locations based on the client device IDs included with the first request;
sending, by the processing device, the sets of the audio data including the selected location-specific content to the ones of the business locations via the network, where at least some of the sets of the audio data differ; and
sending, by the processing device, a schedule of the location-specific content to the ones of the business locations via the network, where the sending the selected location-specific content comprises sending the sets of the audio data separate from the schedule of the location-specific content.

9. The method of claim 8, further comprising:
receiving and storing, at each of the ones of the businesses, the schedule of the location-specific content;
receiving and storing, at each of the ones of the businesses, at least some of the selected location-specific content; and
receiving and storing, at each of the ones of the businesses, at least some of the audio data.

10. The method of claim 9, further comprising:
producing sound, at each of the ones of the businesses, from the at least some of the audio data; and
producing sound, at each of the ones of the businesses, from the at least some of the selected location-specific content at a time based on the stored schedule of the location-specific content.

11. The method of claim 9, further comprising:
inserting, at each of the ones of the businesses, portions of the selected location-specific content into the at least some of the audio data.

12. A method comprising:
receiving, at a processing device and via a network, a first request for multiple sets of audio data, each of the sets of audio data including location-specific content corresponding to each of a plurality of business locations, where the first request includes multiple client device identifiers (IDs) for ones of the business locations;
selecting, by the processing device and from a plurality of stored, different location-specific content and responsive to the first request, location-specific content corresponding to each of the ones of the business locations based on the client device IDs included with the first request;
sending, by the processing device, the sets of the audio data including the selected location-specific content to the ones of the business locations via the network, where at least some of the sets of the audio data differ; and
changing, by the processing device, the stored, different location-specific content based on sales data associated with each of the plurality of the business locations.

13. A system for delivering audio data, the system comprising:
a first processing device; and
a second processing device,
where the first processing device is configured to:
receive a first request, via a first network, from the second processing device, for multiple sets of audio data, each of the sets of audio data including location-specific content corresponding to each of a plurality of business locations, where the first request includes multiple client device identifiers (IDs) for ones of the business locations,
select, from a plurality of stored, different location-specific content and responsive to the first request, location-specific content corresponding to each of the ones of the business locations based on the client device IDs included with the first request, and
send sets of the audio data with the selected location-specific content to the second processing device; and
the second processing device is configured to:
receive, via the first network, the sets of the audio data including the selected location-specific content, and
forward the sets of the audio data to respective ones of the businesses via a second network, where at least some of the sets of the audio data differ.

14. The system of claim 13, where the first processing device is further configured to send the sets of the audio data including the selected location-specific content to the second processing device via a virtual private network.

15. The system of claim 13, where the ones of the businesses produce sound based on sets of the audio data received with the selected location-specific content.

16. The system of claim 13, where the location-specific content includes a notice or an advertisement.

17. The system of claim 13, where the second device is further configured to insert the location-specific content into the sets of the audio data.

18. The system of claim 13, further comprising:
a third processing device,
where the third processing device is configured to:
send a second request to the one of the ones of the business locations via the second network, and
receive audio data and the location-specific content from the one of the ones of the business locations via the second network in response to the second request.

19. The system of claim 18, where the third processing device is further configured to produce sound from the received audio data.

20. The system of claim 18, where the second network includes a virtual private network through which the one of the ones of the business locations and the third processing device are configured to communicate with one another.

21. The system of claim 13, where the first processing device is further configured to:
send a schedule of the location-specific content to the second processing device via the first network, and
send, to the second processing device, the selected location-specific content and the schedule of the location-specific content separately from each other.

22. The system of claim 21, where the second processing device is further configured to:
receive and store the schedule of the location-specific content,
receive and store at least some of the location-specific content, receive and store at least some audio data, and where third processing devices at each of the ones of the business locations are configured to:

produce sound based on the at least some of the audio data, and produce sound based on the at least some of the location-specific content.

23. The system of claim 21, where the second processing device is further configured to:

receive and store the schedule of the location-specific content, receive and store at least some of the location-specific content, receive and store at least some audio data, and insert portions of the location-specific content into the at least some of the audio data based on the schedule of the location-specific content.

24. A machine-readable medium containing instructions for controlling at least one processor to perform a method, the method comprising:

receiving, via a network and from a first processing device, a first request for multiple sets of audio data, each of the sets of audio data including location-specific content corresponding to each of a plurality of business locations, where the first request includes multiple client device identifiers (IDs) for ones of the business locations;

selecting, from a plurality of stored, different location-specific content and responsive to the first request, location-specific content corresponding to each of the ones of the business locations based on the client device IDs included with the first request; and sending, separately from each other, a schedule of the location-specific content, the selected location-specific content, and the sets of the audio data, to the first processing device via the network, where at least some of the sets of the audio data differ.

25. The machine-readable medium of claim 24, the method further comprising:

sending the sets of the audio data and the selected location-specific content via a virtual private network.

26. The machine-readable medium of claim 24, where the location-specific content includes a notice or an advertisement pertaining to a particular location.

27. A machine-readable medium containing instructions for controlling at least one processor to perform a method, the method comprising:

sending a first request to a first processing device via a first network, for multiple sets of audio data, each of the sets of audio data including location-specific content corresponding to each of a plurality of business locations, where the first request includes multiple client device identifiers (IDs) for ones of the business locations;

receiving a schedule of the location-specific content from the first processing device via the virtual private network; and receiving, from the first processing device via the first network and responsive to the first request, the sets of the audio data corresponding to each of the ones of the business locations based on the client IDs, the sets of the audio data and the location-specific content being sent separately from one another.

28. The machine-readable medium of claim 27, the method further comprising:

sending the audio data and the location-specific content to a plurality of second processing devices associated with the ones of the business locations via a second network from the first processing device.

* * * * *